United States Patent [19]
Fawcett et al.

[11] 3,930,529
[45] Jan. 6, 1976

[54] METHOD AND APPARATUS FOR REMOVING TREAD FROM TIRES

[75] Inventors: William E. Fawcett, Latrobe; William D. Armbrust, Greensburg; Robert S. Gulibon, Mount Pleasant, all of Pa.

[73] Assignee: Kennametal Inc., Latrobe, Pa.

[22] Filed: May 9, 1974

[21] Appl. No.: 468,403

[52] U.S. Cl................................. 157/13; 29/105 A
[51] Int. Cl............................................. B29h 21/01
[58] Field of Search......... 157/13; 29/105 A, 105 R, 29/78; 82/4 E; 83/355, 356.3

[56] References Cited
UNITED STATES PATENTS

| | | | |
|---|---|---|---|
| 2,656,591 | 10/1953 | Billman | 29/105 A |
| 2,751,663 | 6/1956 | Leuzinger | 29/105 A |
| 2,930,110 | 3/1960 | Glodde | 157/13 |
| 3,242,553 | 3/1966 | Bogsten | 29/105 R |
| 3,426,828 | 2/1969 | Neilsen | 157/13 |
| 3,526,025 | 9/1970 | Sletten | 29/105 R |
| 3,604,084 | 9/1971 | Krieger et al. | 29/105 R |

Primary Examiner—Al Lawrence Smith
Assistant Examiner—Harold P. Smith, Jr.
Attorney, Agent, or Firm—Melvin A. Crosby

[57] ABSTRACT

A method and apparatus for removing tread from tires preparatory to retreading of the tires in which a tire is mounted on a support and inflated and rotated on the axis of the tire. The tread is removed from the tire by a cutter disc which has cutting elements mounted thereon in an annular path with the annular path being presented to the periphery of the tire. The cutter disc and tire are moved relatively to cause the annular path of the cutter disc in which the cutting elements are mounted to traverse the tire from side to side and in a single pass across the tire the tread is removed therefrom. The relative movements between the tire and the cutter disc are under the control of a cam so that the proper contour is imparted to the periphery of the tire. The cutting elements mounted in the aforesaid annular path of the cutter disc are in the from of sharp edged discs of hard material which take clean chips from the tread of the tire thereby avoiding heating of the tire or the cutting elements and, likewise, eliminating smoke and dust that normally accompanies the removal of tread material by the use of a cutting device employing rasp elements therein.

13 Claims, 6 Drawing Figures

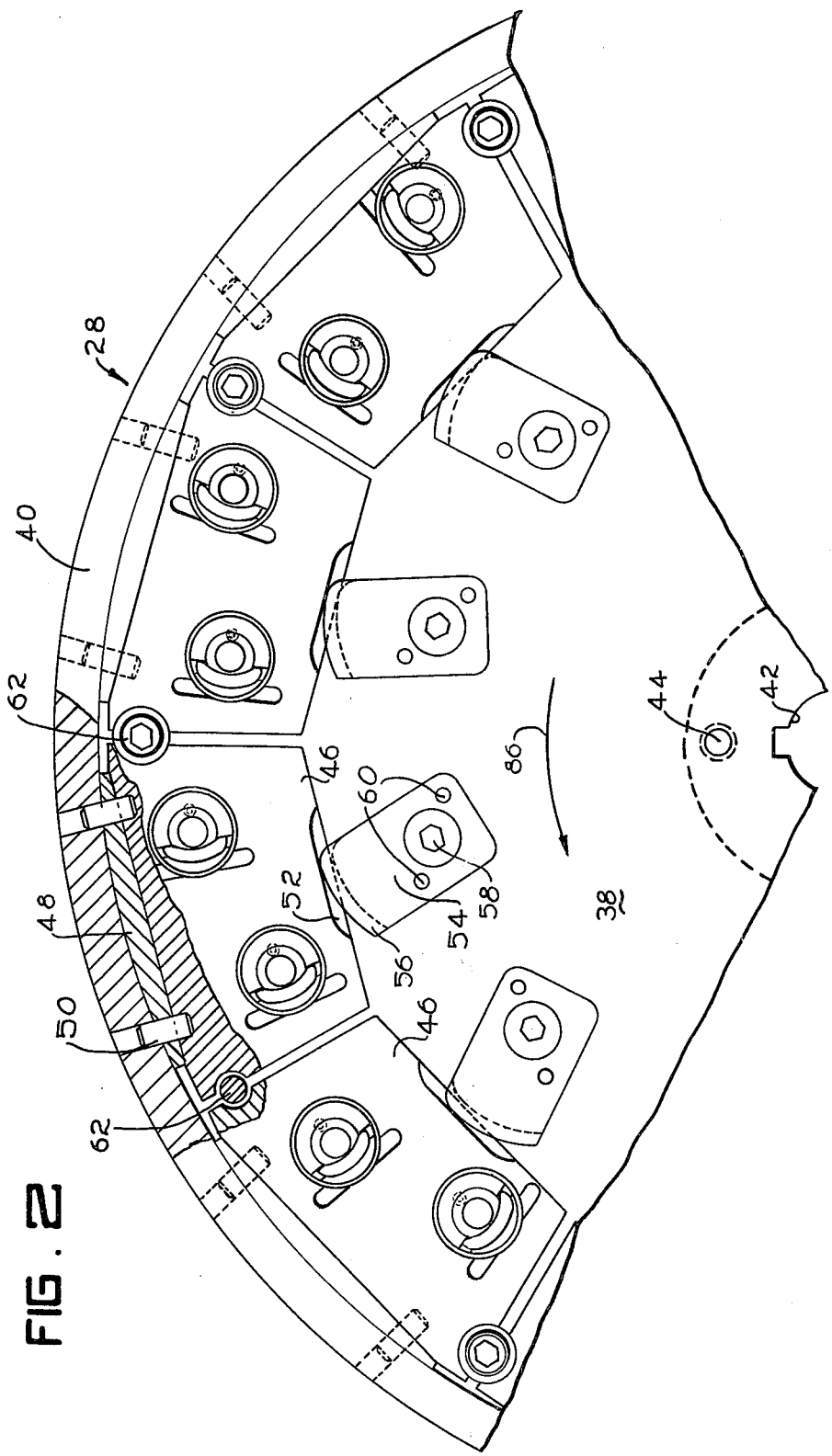

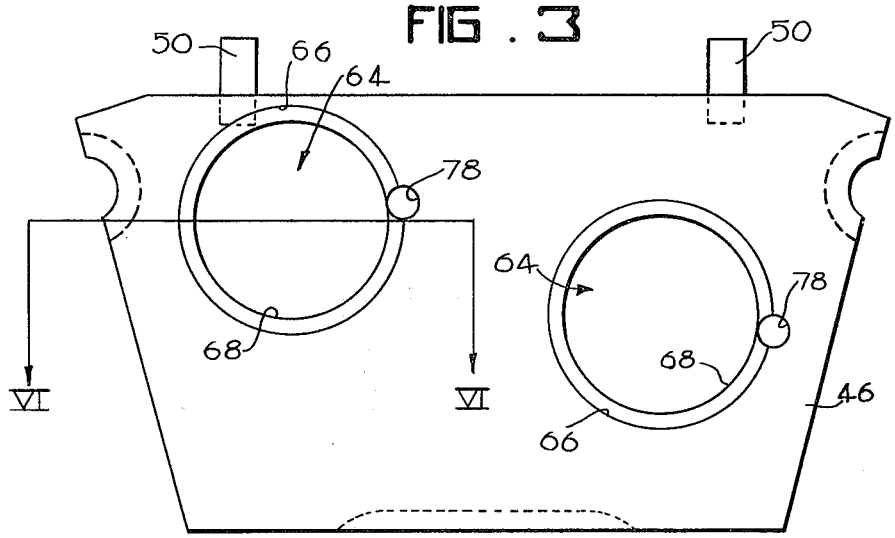
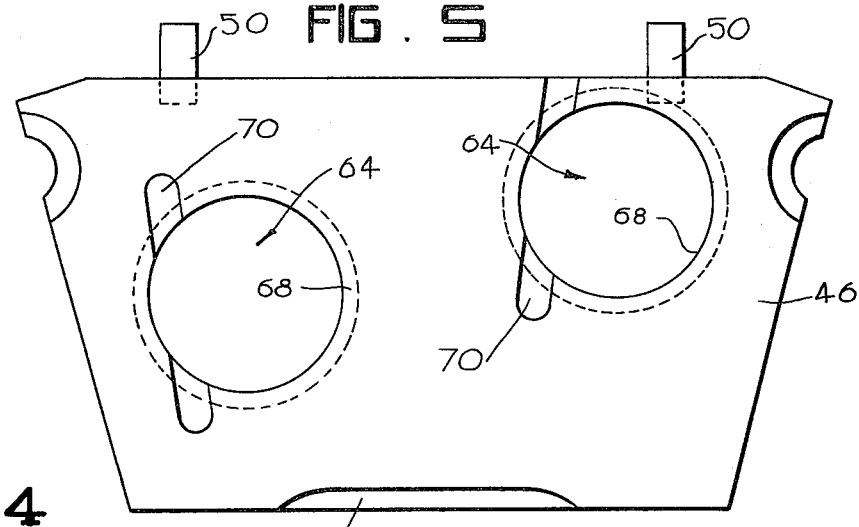
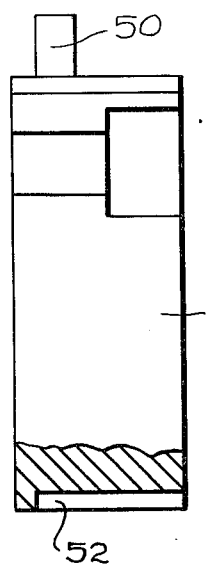
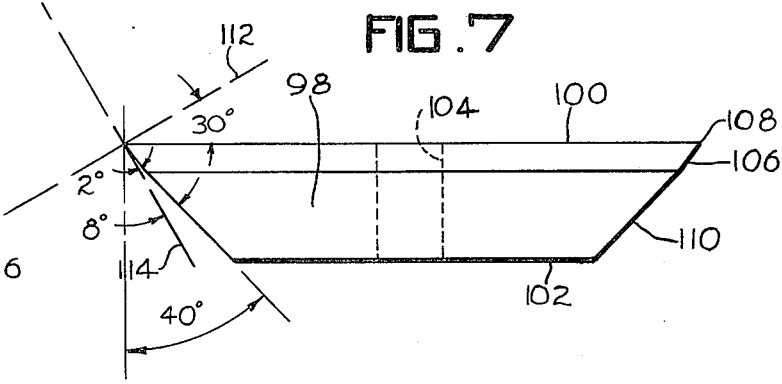

METHOD AND APPARATUS FOR REMOVING TREAD FROM TIRES

The present invention relates to a method and apparatus for removing tread material from pneumatic tires preparatory to retreading thereof and is particularly concerned with such a method and apparatus in which the tread material can be removed extremely rapidly and in the absence of dust and smoke and without creating heat in the tread material of the tire or in the cutting elements.

The removal of tread material from tires preparatory to retreading the tires is known and is generally accomplished by engaging the periphery of the tire with what is known as a rasp and moving the tire and rasp relatively to cause the tread material to be removed from the tire.

The rasp referred to is a member having a plurality of sharp points projecting therefrom so that the tread material is removed in extremely fine form with simultaneous development of heat which results in the heating of the tire and in the generation of smoke. Furthermore, the fine tread material removed from the tire creates a dusty condition.

Still further, the rasps have a limited cutting depth and a substantial amount of time is required completely to remove tread material from a tire to the proper depth.

BRIEF SUMMARY OF THE INVENTION

According to the present invention, instead of using rasp-like elements as cutters, sharp edged cutting elements are employed. The sharp edged cutting elements in the form of discs are employed, and when cutting elements of this nature are moved relative to the tire, each cutting element will take a clean cut and will remove a chip of tread material of substantial size from the vehicle tire being treated.

With the cutting elements disposed at a certain angle to the tread surface, and with the cutting edge of the cutting element formed to a sharp edge, it has been found that the cutting of the tire tread is clean and that heat is not developed in the cutting elements or in the tire while, at the same time, the tread material is removed more rapidly than is possible when using a rasp element.

The generation of fine particles of tread material is eliminated, and since there is no substantial amount of heat in the process, there is also no smoke. It is also the case that the chips of substantial size which the cutting elements remove from the tread material can be employed for making mats and the like whereby an economy is realized in respect of the material removed from the tire tread and which, heretofore, has presented a disposal problem.

The tire to have the tread removed therefrom is mounted on a wheel and is inflated to about 30 pounds and is then rotated on the axis thereof. The cutter disc according to the present invention is mounted on an axis extending substantially perpendicular to the axis of rotation of the tire and is offset in a direction perpendicular to the axis of the tire so that an annular region of the cutter disc is presented on the periphery of the tire.

Mounted on the cutter disc in the aforementioned annular region are support blocks in substantially end to end relation and also having the sides facing the tire coplanar. Each block advantageously has two sockets formed therein and a cutting element holder arrangement is disposed in each socket for holding a respective cutting element. The cutting elements about the annular area are staggered so that each cutting element engages a substantial body of tread material as it passes by the tire thereby establishing the cutting conditions which enable each cutting element to remove a chip of substantial size from the tread of the tire.

Each cutting element is disposed substantially radially with respect to the cutter disc and has a portion thereof protruding axially from the cutter disc toward the tire. Each cutting element is inclined in the direction of rotation of the cutter disc at the axially outer end so as to have a relatively large positive rake angle with respect to the tire tread. The periphery of each cutting element is bevelled so as to converge toward the rearward side of the cutting element and at such an angle as to provide a small clearance immediately rearwardly of the cutting edge of the cutting element.

The cutting elements, or inserts, are advantageously circular and are located in the respective holding device by a pin engaging a center hole in the insert so that the insert can be indexed about the center thereof thereby permitting the entire peripheral region of the insert to be employed in cutting the tire tread.

During a cutting operation, the tire and cutter disc rotate on the respective axes thereof while the cutter disc and tire are moved relatively to cause the annular path of the cutter disc in which the cutting elements are mounted to traverse the tire from side to side. This relative movement is under the control of a cam which causes the tire to be cut to the proper shape and depth.

A primary object of the present invention is the provision of a method and apparatus for removing tread material from vehicle tires preparatory to retreading thereof in which the tread removing operation is accomplished without the development of any substantial amount of heat and without the production of fines and dust and smoke and at higher speeds than have been possible when employing conventional rasp elements.

Another object is the provision of a method and apparatus of the nature referred to above in which the cutting of the tread material is accomplished by individual cutting elements or inserts which are indexable and easily replaceable.

The foregoing objects as well as still other objects and advantages of the present invention will become more apparent upon reference to the following detailed specification taken in connection with the accompanying drawings in which:

FIG. 2 is a fragmentary front elevational view of the cutter disc of FIG. 1 looking in in the direction of line II—II of FIG. 1.

FIG. 3 is an elevational view looking in at the back of one of the blocks detachably connected to the cutter disc and forming the support for the cutting inserts.

FIG. 4 is an end view of the block of FIG. 3 looking in from the right end thereof.

FIG. 5 is a front view of the block of FIG. 3.

FIG. 7 is a view showing a typical insert for use with the cutter device according to the present invention.

DETAILED DESCRIPTION OF THE INVENTION

Figure 1:
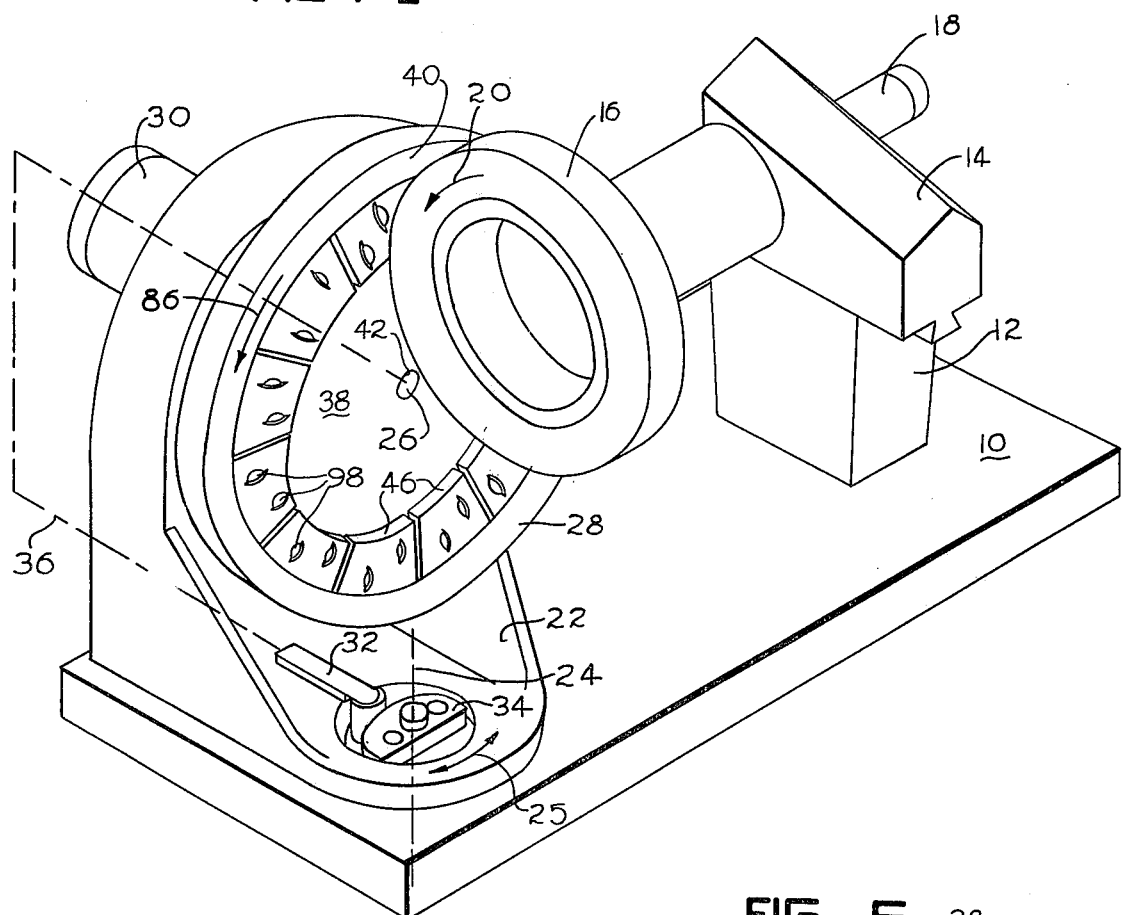
FIG. 1 is a schematic view of an apparatus for removing tread material from tires.

Referring to the drawings somewhat more in detail, FIG. 1 schematically illustrates a machine with which the cutter device according to the present invention is adapted for use.

The machine of FIG. 1 comprises a base portion 10 and mounted thereon near one end is a pedestal 12 on the top of which is slidably mounted a support 14 which rotatably carries a spindle on which the tire 16 to be worked is mounted. A drive motor 18 is provided for driving the spindle and, accordingly, tire 16 is rotated, preferably, in the direction of the arrow 20 marked on the tire.

Base 10 also supports a frame 22 which is rotatable on an axis 24. The frame 22 carries a tool spindle, the end of which is indicated at 26 and on which is supported a large disc cutter 28. A motor 30 is provided for driving the spindle 26 in rotation. The spindle 26 is also moveable axially and such axial movements of the spindle are under the control of a feeler 32 which engages the periphery of a replaceable cam 34 nonrotatably connected to base 10.

In practice, the frame 22 is motor driven by an arrangement not shown in the drawings and this causes feeler 32 to traverse cam 34 from side to side. Reciprocal movements of feeler 32 in frame 22 are conveyed via a connection 36 schematically illustrated in FIG. 1 thereby to cause axial movement of spindle 26 in support 22. In this manner, the cutter 28 produces the desired contour on the tire 16 being operated.

FIG. 2 shows a representative portion of rotary cutter 28. Cutter 28 comprises a disc-like back plate 38 having a circumferential upstanding axial flange 40 within which are nested individual cutter devices. Disc-like plate 38 has a central bore 42 for receiving the spindle and to which the plate is keyed while being bolted to a flange on the spindle by bolts passing through bolt holes 44.

The cutter illustrated at 28, and which is typical, is adapted for receiving up to 12 tool devices in circumferentially distributed relation with cutting elements in each of the devices. In FIG. 2, a group of four of the cutting devices are illustrated and these form a sequence with the cutting elements being distributed radially within the sequence so that each insert takes an individual cut on the tire as it moves past the tire.

Each of the cutting devices in FIG. 2 comprises a block 46 resting flat on the plate 38 and at the outer edge having a sector shaped filler plate 48 interposed between the respective block and the inside of flange 40. Dowel pins 50 are provided on the blocks and these extend through the filler plates and into corresponding holes provided in flange 40.

On the radially inner side, each of the blocks is provided with a notch 52 and pivotally mounted on plate 38 adjacent the radially inner side of each block is a cam 54 having a projecting lip 56 for engagement with a notch of the respective block. A clamp screw 58 extends through each of the cams and is employed for tightening the cam up on plate 38 after the cam has been adjusted into clamping engagement with the respective block. Spanner wrench holes 60 in the cam may be provided for forcibly moving the cam into clamping position.

Between each two adjacent ones of the blocks 46 and advantageously disposed near the radially outer edges thereof are bolts 62 which are threaded into plate 38 and which have heads thereon which clampingly engage the blocks on either side thereof.

The desired arrangement permits easy insertion and removal of the individual cutting devices, merely by releasing the respective cam at the radially inner side and removing the bolts 62, whereupon a block can easily be replaced with another.

Figure 6:
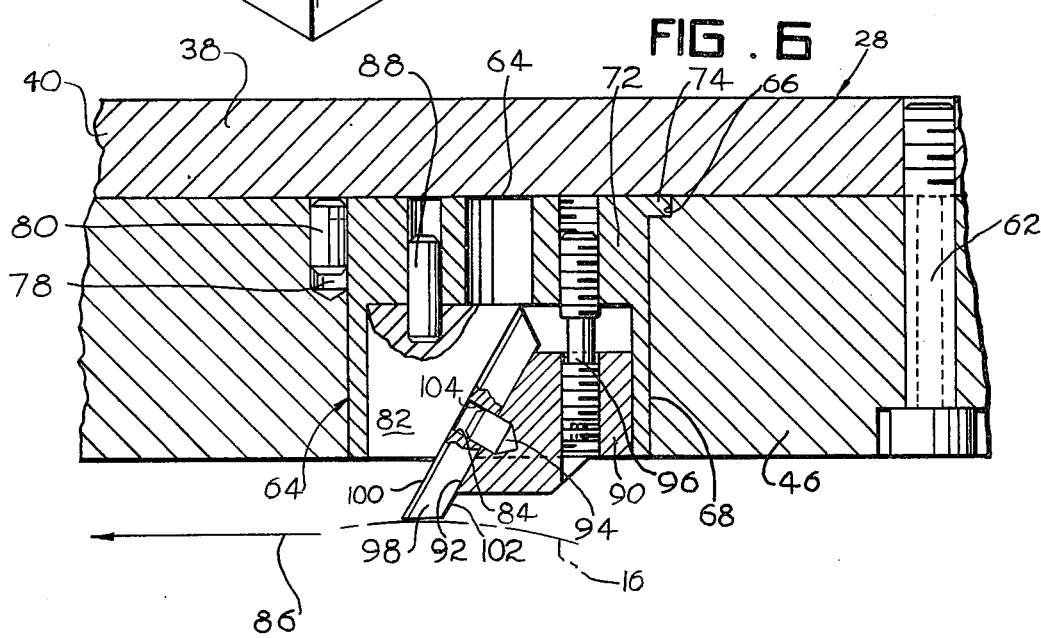
FIG. 6 is a sectional view indicated by line VI—VI in FIG. 2.

FIGS. 4, 5 and 6 show details in connection with the individual blocks 46 and wherein it will be seen that each block 46 has a pair of counterbored recesses 64 extending therein with the larger diameter portion 66 opening toward the rear of the block and the smaller diameter portion 68 opening toward the front of the block.

In FIG. 5, which is a front view of the block, it will be seen that there is provided extending substantially radially across the leading side of each of the recesses 64, a groove 70 which cooperates in guiding the chips away from the respective cutter elements.

FIG. 6 is a sectional view showing the manner in which the recesses 64 are availed of for providing supports for cutting inserts mounted in the several blocks.

In FIG. 6, it will be seen that a recess 64 is adapted for receiving a sleeve 72 having a flange 74 seated in the counterbore which forms the larger diameter portion 66 of the respective recess. The remainder of the sleeve 72 extends through the smaller diameter portion 68 of the respective recess.

At one peripheral point about the recess 64, there is provided a drilled hole 78 disposed in overlapping relation with flange 74 and mounted in the drilled hole in a locating pin 80 which, as will be seen in FIG. 6, engages the flange 74 of the sleeve and locates the flange angularly within the respective block 46.

Each recess has mounted therein from the open side a block 82 having an inclined wall 84 facing in a direction opposite to the direction of rotation of the cutter. The direction of rotation of the cutter is indicated by arrow 86 on FIGS. 1, 2 and 6.

The block 82 is located angularly in sleeve 72 as by dowel pin 88 and bears directly on the closed bottom wall of sleeve 72 as shown in FIG. 6.

Also, mounted in sleeve 72 is a clamp block 90 which, on the leading side, has a wall 92 parallel to wall 84 of the block member 82. Block 90 also carries a pin 94 upstanding from wall 92.

A clamp screw therefrom is provided having one end threadedly engaging the bottom wall of sleeve 72 and the other end engaging block 90 with the opposite ends of the screw being oppositely threaded so that upon rotation of the screw, block 90 will be rapidly drawn into sleeve 72 or it will be rapidly pushed outwardly threrefrom while the threads on the opposite ends of the screw still remain single pitch and, thus, will clamp the block 90 tightly in position.

A cutting insert 98 is provided having parallel top and bottom faces with top face 100 engaging inclined wall 84 and with the bottom face 102 engaging inclined wall 92. The insert has a central hole 104 which is engaged by pin 94, and it will be evident that the insert, when mounted on pin 94, will be clamped firmly in position between blocks 82 and 90 upon tightening of screw 96. Furthermore, the insert will be precisely located in the radial and circumferential directions of plate 38 and will be held at a predetermined angle to the axial direction of plate 38.

More specifically, the insert makes an included angle of about 30° with a line parallel to the axis of the plate and passing through the outer leading tip of the insert. This angle is advantageously within the range of about 25° to 35° in order to provide good cutting conditions when the insert engages the rubber-like tread material which is to be cut thereby.

The peripheral wall of the insert 98 tapers inwardly from the top face 100 to the bottom face 102 of the insert at such an angle as to provide clearance behind the cutting edge of the insert which is formed where the peripheral wall intersects the top face.

As will be seen in FIG. 7, the peripheral wall of the insert comprises a first relatively narrow portion 106 adjacent cutting edge 108 of the insert which makes a larger included angle with top face 100 of the insert and a second and somewhat longer portion 110 making a smaller included angle with top face 100 and extending to bottom face 102. The angle of the portion 106 of the peripheral wall is selected so that when the insert is tilted relative to the work as shown in FIG. 6, a clearance angle, which may be on the order of from about 2° to about 6° or 8° is provided behind cutting edge 108.

For example, if the angle of forward inclination of the insert 98 is such as to provide a forward rake angle of 30° as indicated by dot-dash line 112 on FIG. 7, the portion 106 would be formed at such an angle as to make an included angle of from about 2° to 6° with a line perpendicular to line 112, the last mentioned line being indicated at 114 in FIG. 7. Portion 110 will make an included angle with the plane of top face 100 of the insert which is about 6° to 8° greater than the angle made by portion 106.

It has been found that an insert, such as an insert formed of a hard refractory material, tungsten carbide, for example, will thereby have a cutting edge imparted thereto which is solidly supported rearwardly from the cutting edge and which insert will have relatively long life.

It will be evident that the inserts 98 are advantageously circular whereby, when a circumferential region thereof becomes worn or dull or becomes chipped, the insert can readily be indexed about the axis of the center hole 104 to present a fresh cutting edge to the tire being cut.

It will also be evident, upon reference to FIG. 2, that each of the several cutting inserts illustrated in a sequence of the cutting devices as represented by the blocks 46, will cut in a respective area or respective circumferential region of the tire being operated and that, accordingly, each insert will encounter a substantial body of tread material.

It is important that each insert encounter a substantial body of tread material because the tread material in every case is somewhat resilient and can yield under pressure. It has been found that if each insert engages a substantial body of rubber, the insert will take a clean cut on the tread of the tire and expose a clean, smooth surface for receiving recap material.

If it is attempted to take extremely fine cuts from the tire but cutting elements as disclosed herein, the tread tends to yield radially and a rubbing action of the inserts on the tire takes place. This can lead to heating up of the tire being operated and it can also lead to heating up of the inserts and wear of the inserts can also take place, in addition to the objectionable heating referred to.

If, on the other hand, each insert engages a substantial body of tread material as it is driven past the tire, the insert will take a clean cut and a minimum amount of heat will be developed in both the tire being operated and in the cutting inserts.

It has been found that relatively high velocities are of merit in cutting a tire with a cutting device according to the present invention and a suitable relative speed between the tire and the cutter has been determined to be about 9,000 to 11,000 feet per minute. For example, the disc may rotate at a speed to cause the cutting elements to move at up to about 10,000 feet per minute while the tire rotates at a speed such that the periphery of the tread moves at up to about 1,000 feet per minute.

Under these conditions, it has been found that the cutting device according to the present invention cuts cleanly and can prepare a tire for recapping with a single pass across the tire. During a single pass across a tire to remove the tread therefrom, the frame 22 carrying the cutting device pivots on the axis 24, as indicated by double arrow 25, while being under the control of cam 34 and feeler 32 so that the desired contour is imparted to the tread of the tire being operated. Cutting of the tire occurs only in one direction of pivotal movement of frame 22 with the frame making an idle return traverse prior to taking another cut.

A surprising result obtained by cutting tires according to the present invention is that recap material vulcanized to the tread has greater resistance to separation from the tread than is the case when a tire tread is removed from a tire by buffing or rasping. It has been thought in the past that the rough surface left on a tire tread by buffing or rasping was important for giving the tire casing a surface to which the recap material would adhere tightly.

Surprisingly, however, it has been found that the clean, smooth surface resulting from cutting the tread away on a tire by a cutter device of the present invention provides for superior adherence, up to 50 percent greater, of the recap material than can be obtained when corresponding tire carcasses are buffed or abraded off by some sort of rasping or abrading device.

It has already been mentioned that the tire and the cutter stay cool during an operation, and it is also the case that the chips taken by the cutter device are in the form of discrete chips of substantial size as opposed to the dust and fines and small fragments that are removed from a tire carcass when it is treated with a rasp element.

Thus, there is substantially less smoke and dust and fines so that the working of a tire by a device according to the present invention presents less environmental hazards to workers and other personnel than is the case with machines in which rasps are employed.

An advantage of removing the tread material from the tire in the form of discrete cleanly cut chips of substantial size, with an attendant reduction in generated heat, is that there is substantially less fire hazard in connection with the tread removal operation. The cutter according to the present invention does not develop extremely fine particles of rubber-like material which have to be gathered by a dust collecting system and, therefore, there is no accumulation of fine rubber-like particles which could create a dangerous fire hazard.

It might further be mentioned that the arrangement of insert locating pin 94 on the wedge member 90 is of particular merit because, with the pin on the wedge, the pin advances the insert into the proper position as the wedge is drawn up tight in the recess provided therefor while, at the same time, retraction of the wedge from clamping position will also draw the insert outwardly so that it can easily be removed, or indexed to a new position, or so that a new insert can readily be inserted into the nest formed therefor by block 84 and clamping wedge 90.

It will further be appreciated that the pin 94 positively holds the insert in the rotating cutter disc so that even if the wedge member 90 were to become loose for any reason, the insert would not be thrown out of the cutter disc or become displaced therein far enough to create a dangerous situation or one which would bring about damage to the tire being operated.

The arrangement of the pin 94 on the wedge member 90 thus forms both a convenience in respect of assembling and disassembling the inserts with the cutter disc but also forms a safety feature.

Modifications may be made within the scope of the appended claims.

What is claimed is:

1. Cutting means for a machine for removing a tread from a tire in which the machine comprises a tool spindle rotatable in a predetermined direction on a first axis and a work spindle defining a second axis on which a tire is rotatable with the tread opposed to an annular region of a tool disc on said tool spindle, said axes being relatively pivotal about a third axis to present a lateral range of the tire tread to the tool disc, said cutting means comprising; a tool disc on said tool spindle, an axial flange at the periphery of said tool disc, blocks detachably mounted and arranged in end to end relation radially inside said flange and forming an annular region on said disc, pocket means distributed circumferentially in said annular region of the disc, and circular cutting inserts of hard wear resistant material detachably and indexably mounted in said pocket means in predetermined axial and radial positions relative to the tool disc, each insert having a peripheral portion protruding axially and angularly from the tool disc for cutting engagement with a tire on said work spindle, each insert having the diameter thereof which is parallel to the plane of said tool disc extending substantially radially of the disc and each insert being inclined in the direction of rotation of said disc to provide an effective positive radial rake angle of not less than about 20°.

2. Cutting means according to claim 1 in which each said insert has parallel top and bottom faces with the top face on the leading side and the bottom face on the trailing side, the peripheral wall of said insert being bevelled off rearwardly from said top face to form a sharp cutting edge on the insert at the juncture of the peripheral wall of the insert with leading side of the insert.

3. Cutting means according to claim 2 in which the bevel on the peripheral wall of the insert comprises a first region adjacent the top face making a larger included acute angle with said top face and a second region extending from said bottom face to the first region and forming a smaller included acute angle with said top face.

4. Cutting means according to claim 1 in which said inserts are distributed radially in said annular region of the disc.

5. Cutting means according to claim 2 in which each pocket means includes a cylindrical axial recess in a respective block, a plug element fixed in the recess and having an inclined support wall for engagement with the top face of a respective insert, a clamp element receivable in the recess and having an inclined clamping wall parallel to said support wall and engageable with the bottom face of the insert, and means for clamping said clamp element in said recess to clamp the insert between the plug element and the clamp element.

6. Cutting means according to claim 5 in which the insert has a central axial hole and said clamp element includes a pin upstanding therefrom and engageable with the hole in the insert.

7. Cutting means according to claim 5 in which each block has at least one axial bore extending therethrough and counterbored from the end nearest said disc, and a cup-shaped sleeve element receivable in said bore from the counterbore and open toward the other end and forming a said recess for receiving an insert.

8. Cutting means according to claim 5 which includes a relieved region adjacent the top face of each insert for the flow of chips taken from a tire tread.

9. A method of removing tread material from a pneumatic tire preparatory to recapping thereof which comprises; rotating the tire on the axis thereof, arranging sharp edged cutting inserts on an annular surface in annularly and radially differing spaced relation and arranging said surface such that said inserts are at a positive radial rake angle of at least about 20° relative to the tire tread when adjacent thereto, moving the inserts relative to the tire while maintaining said rake angle, and feeding the tire and cutting inserts toward each other to cause each insert to take a discrete chip which is relatively narrow but of substantial length from the tread of the tire each time the respective insert moves past the tread of the tire.

10. A method according to claim 9 in which the tire and inserts are fed toward each other at a feed rate such that each insert encounters a substantial body of tread material each time an insert engages the tire.

11. A method according to claim 9 in which the tire is rotated on the axis thereof during cutting while the inserts are mounted in a rotary tool holder, and said tire and holder are moved relatively during cutting of the tread to cause the region of the tread cut by the inserts to progress laterally across the tire tread and partway along the side wall portions of the tire.

12. A method according to claim 9 in which the tire is rotated on the axis thereof during cutting while said inserts move in a circular path about an axis substantially perpendicular to the axis of the tire.

13. A method according to claim 9 in which the chips taken by the respective inserts are closely adjacent one another whereby the tire when fully operated is relatively smooth.

* * * * *